(12) United States Patent
Maass

(10) Patent No.: US 6,431,637 B2
(45) Date of Patent: Aug. 13, 2002

(54) CONVERTIBLE CAR WITH A REAR WINDSHIELD MOVABLE IN A GUIDE TRACK

(75) Inventor: Joachim Maass, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/745,166

(22) Filed: Dec. 20, 2000

(30) Foreign Application Priority Data

Dec. 24, 1999 (DE) ..................................... 299 22 812 U

(51) Int. Cl.⁷ ................................ B60J 1/18; B60J 7/00
(52) U.S. Cl. ........................... 296/146.14; 296/107.07; 296/107.09
(58) Field of Search ..................... 296/146.14, 107.07, 296/107.09

(56) References Cited

U.S. PATENT DOCUMENTS

| | | | | | |
|---|---|---|---|---|---|
| 1,935,468 A | * | 11/1933 | Dittus | .................... | 296/146.14 |
| 2,785,992 A | * | 3/1957 | Chika | .................... | 296/107.07 |
| 2,836,457 A | * | 5/1958 | Beerman et al. | ........ | 296/107.07 |
| 2,957,725 A | * | 10/1960 | Ford, II et al. | ......... | 296/107.07 |
| 2,997,337 A | * | 8/1961 | Day et al. | ............... | 296/107.09 |
| 3,333,362 A | * | 8/1967 | Kostin et al. | ............ | 296/146.14 |
| 4,543,747 A | * | 10/1985 | Kaltz et al. | ............. | 296/146.14 |
| 6,142,555 A | * | 11/2000 | Huber | .................... | 296/107.07 |
| 6,302,470 B1 | * | 10/2001 | Maass et al. | ........... | 296/107.07 |

FOREIGN PATENT DOCUMENTS

| | | | | | |
|---|---|---|---|---|---|
| FR | | 001147600 A | * | 11/1957 | ............. 296/107.07 |
| JP | | 402197418 | * | 8/1990 | ............. 296/107.07 |

* cited by examiner

Primary Examiner—Joseph D. Pape
Assistant Examiner—Hilary Gutman
(74) Attorney, Agent, or Firm—Jordan and Hamburg LLP

(57) ABSTRACT

Convertible vehicle with a roof which can be folded up and is provided with a rear window and two lateral clamping collars at the rear. The rear window is movably in a guideway defined by a roof frame part on the roof and a car body frame part on the car body. In a closed position of the roof, the rear window is movable from a closed normal position into a lowered position. The roof is constructed so that the clamping collars are connected firmly with one another over a transverse connecting part and, between the roof frame part and the car body frame part, a space is provided in the guideway for the passage of the transverse connecting part during the folding up of the roof.

26 Claims, 5 Drawing Sheets

CONVERTIBLE CAR WITH A REAR WINDSHIELD MOVABLE IN A GUIDE TRACK

BACKGROUND OF THE INVENTION

Figure 1:
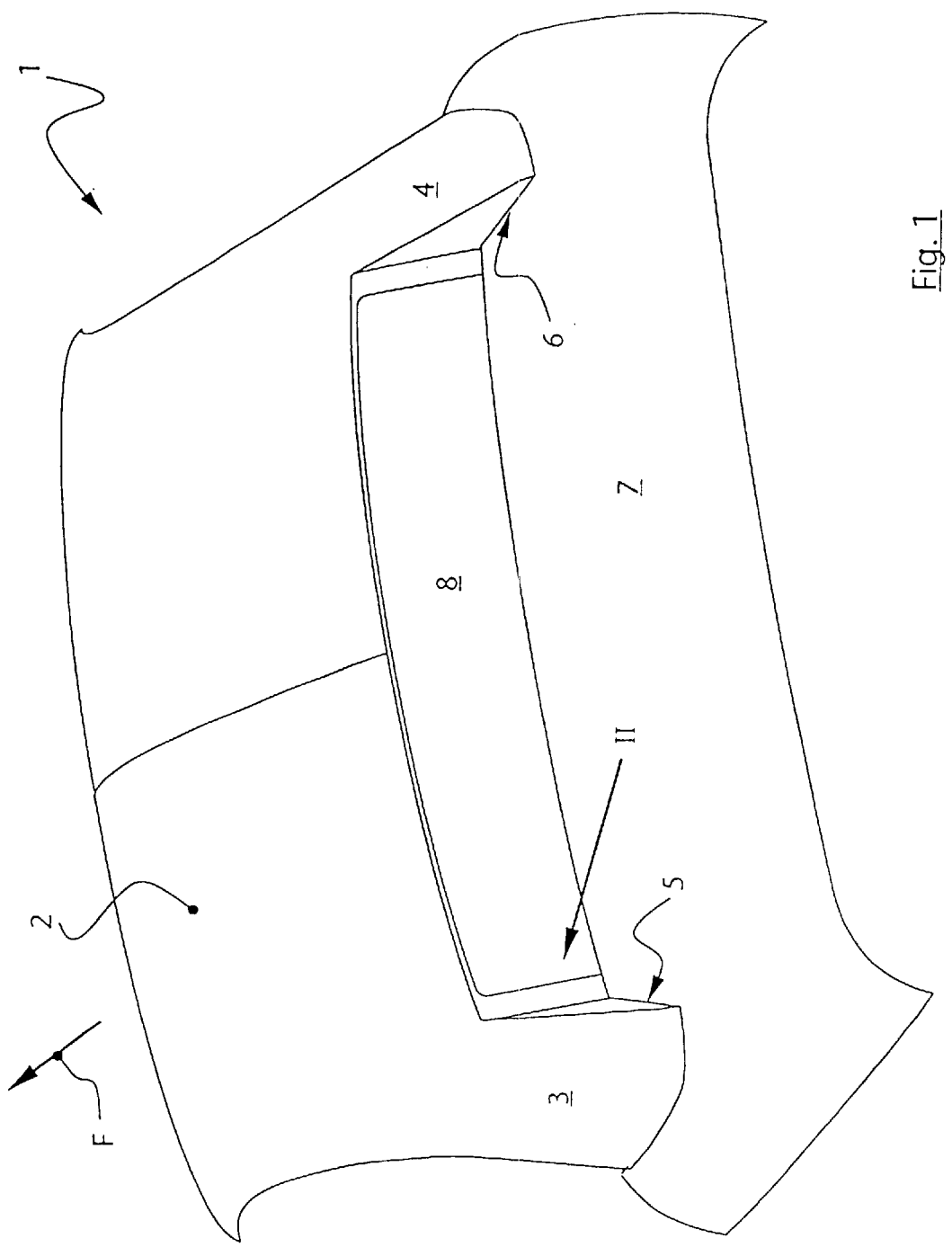

The invention relates to a convertible vehicle with a foldable roof which is provided with a rear window.

Such a convertible vehicle, on the one hand, can be used with a completely open roof and, on the other, when the roof is closed, offers the possibility of opening the rear windows separately. For this purpose, a modular shaft can be provided, which has an opening gap, intended for the rear window and sealed at the top. In this connection, it must be ensured that the rear window can be transferred from a roof frame part, without being tilted, into a car body frame part of the module and vice versa. In addition, for opening the roof while the rear window is in the closed position, it must be possible to tilt the rear window without having it collide with the module in the car body, accommodating it and sealed towards the top.

SUMMARY OF THE INVENTION

It is an object of the invention to provide advantageous relationships in this regard.

Pursuant to the invention, this object is accomplished in a convertible vehicle including a car body comprising a roof movable between a closed position and an open position and including a rear window movable when the roof is in the closed position between a first position in which the rear window is situated m connection with the roof and a second position in which the rear window is situated in the car body. The roof also includes a roof frame part for retaining the rear window when the rear window is in the first position. Two lateral clamping collars each support a respective lateral side of the roof on the car body and a transverse connecting part connects the clamping collars. The clamping collars preferably have a substantially triangular shape. A car body frame part is arranged in the car body for retaining the rear window when the rear window is in the second position so that a guideway is defined by the roof frame part and the car body frame part in which the rear window moves. The roof frame part is separated from the car body frame part by a space whereby the transverse connecting part passes through the space between the roof frame part and the car body frame part during the movement of the roof between the closed and open positions.

By the cross-connection of the triangular clamping collar, a high torsional rigidity is achieved and the possibility that the lateral parts of the roof can tilt towards one another is avoided. The precision of the folding and unfolding of the roof is improved by these means. Accordingly, a very accurate course of movement can be maintained, which also makes possible small tolerances and distances of the components from one another.

By means of the inventive interruption of the guideway (i.e., in view of the spacing between the car body frame part and the roof frame part), it is ensured that the cross-connection part can be pushed over the upper edge of the module on the car-body side when the roof is unfolded, without causing a collision.

If two lateral intermediate guiding parts are disposed in the interruption (i.e., in the space between the car body frame part and the roof frame part, the rear window can be moved with little clearance in the guideway. The guidance of the window is improved by these means, especially when the window is raised from the lowered position.

The cross-connecting part may be constructed, for example, as a pipe, so that the costs of preparing such a component are slight.

An optically particularly unobtrusive arrangement of the cross-connecting part can be achieved when this part is disposed below the plane of a rear part of the cover, covering this transverse connecting part in the opened state of the roof. To avoid a collision while opening the roof, the cross-connecting part, together with the intermediate guiding parts firmly connected to it, can be moved in a guideway extending upward and rearward. Such arrangements are advantageous particularly in a convertible, in which the rear window stands essentially vertically even in the closed position.

Further advantages and details arise out of the example of the object of the invention, shown in the accompanying drawings and as described hereinafter.

IN THE DRAWINGS

Figure 2:
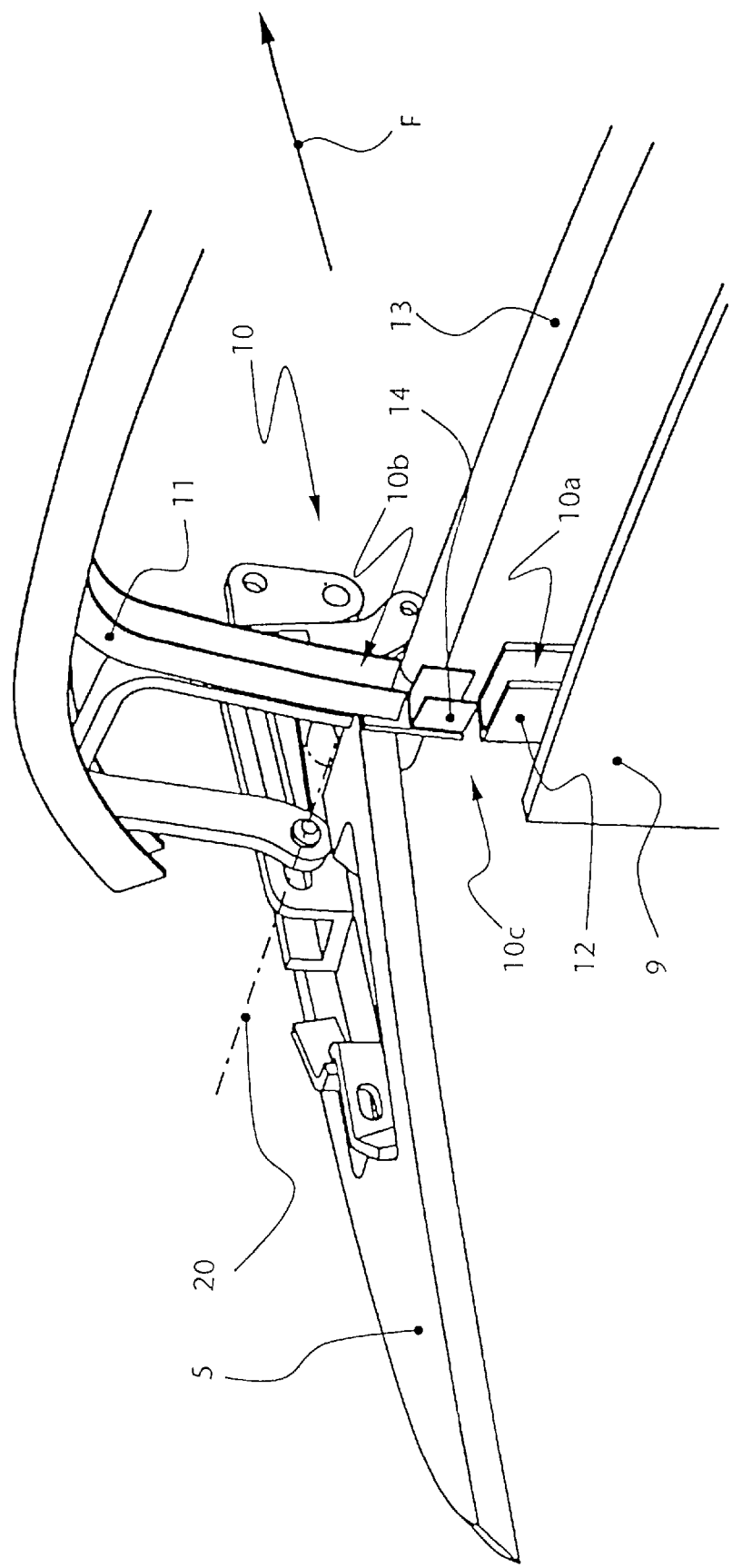
Figure 3:
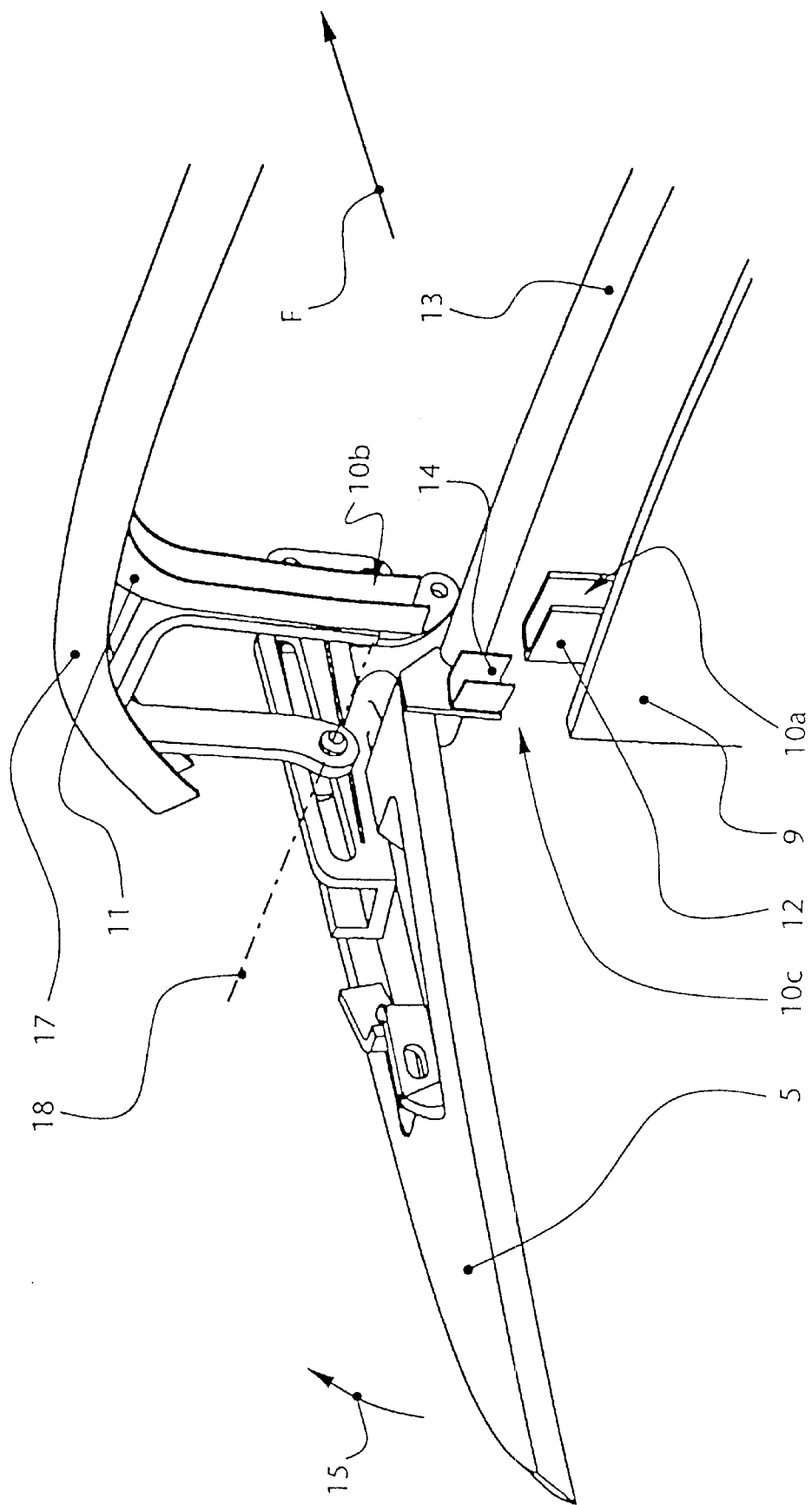
Figure 4:
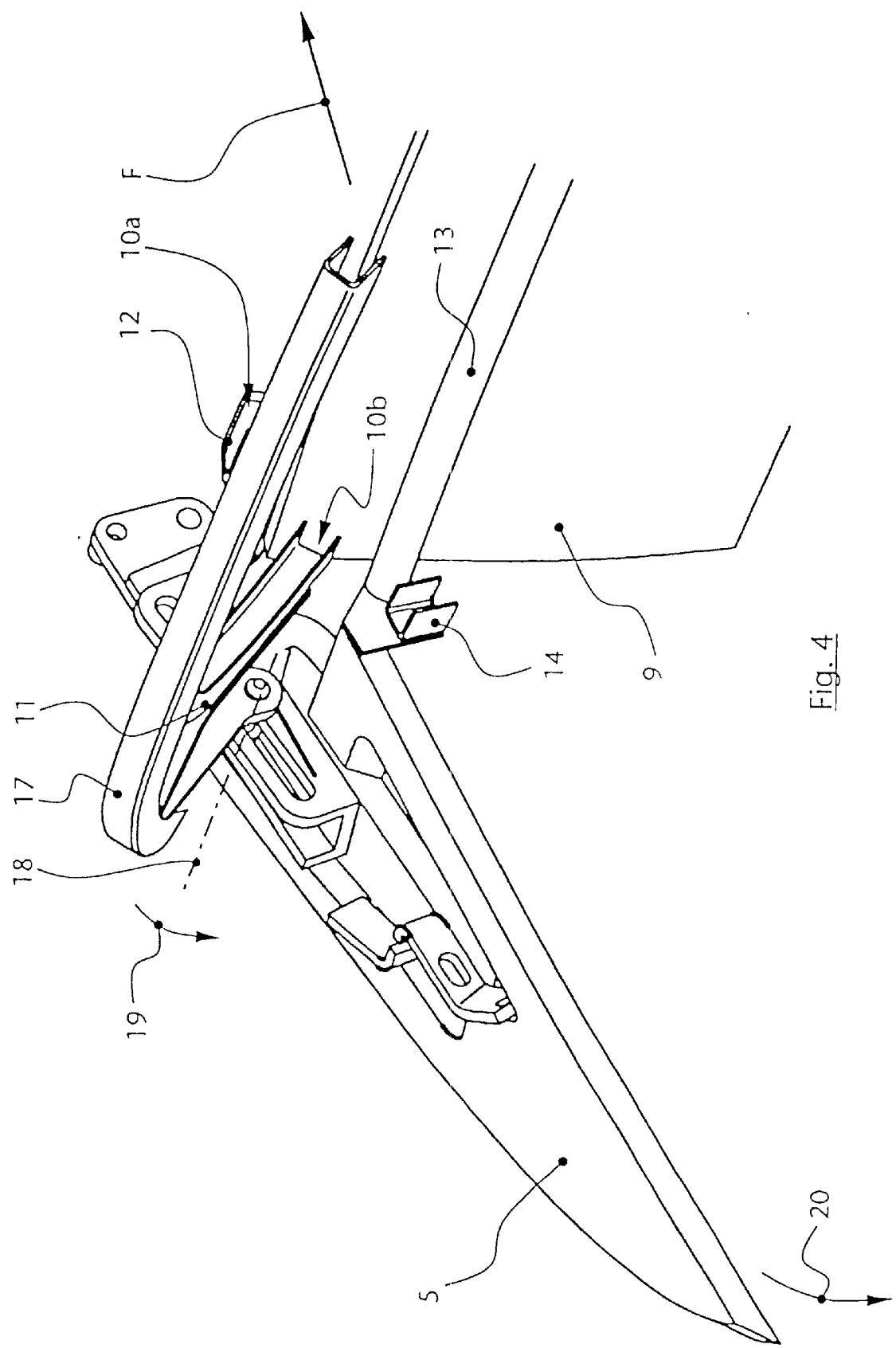
Figure 5:
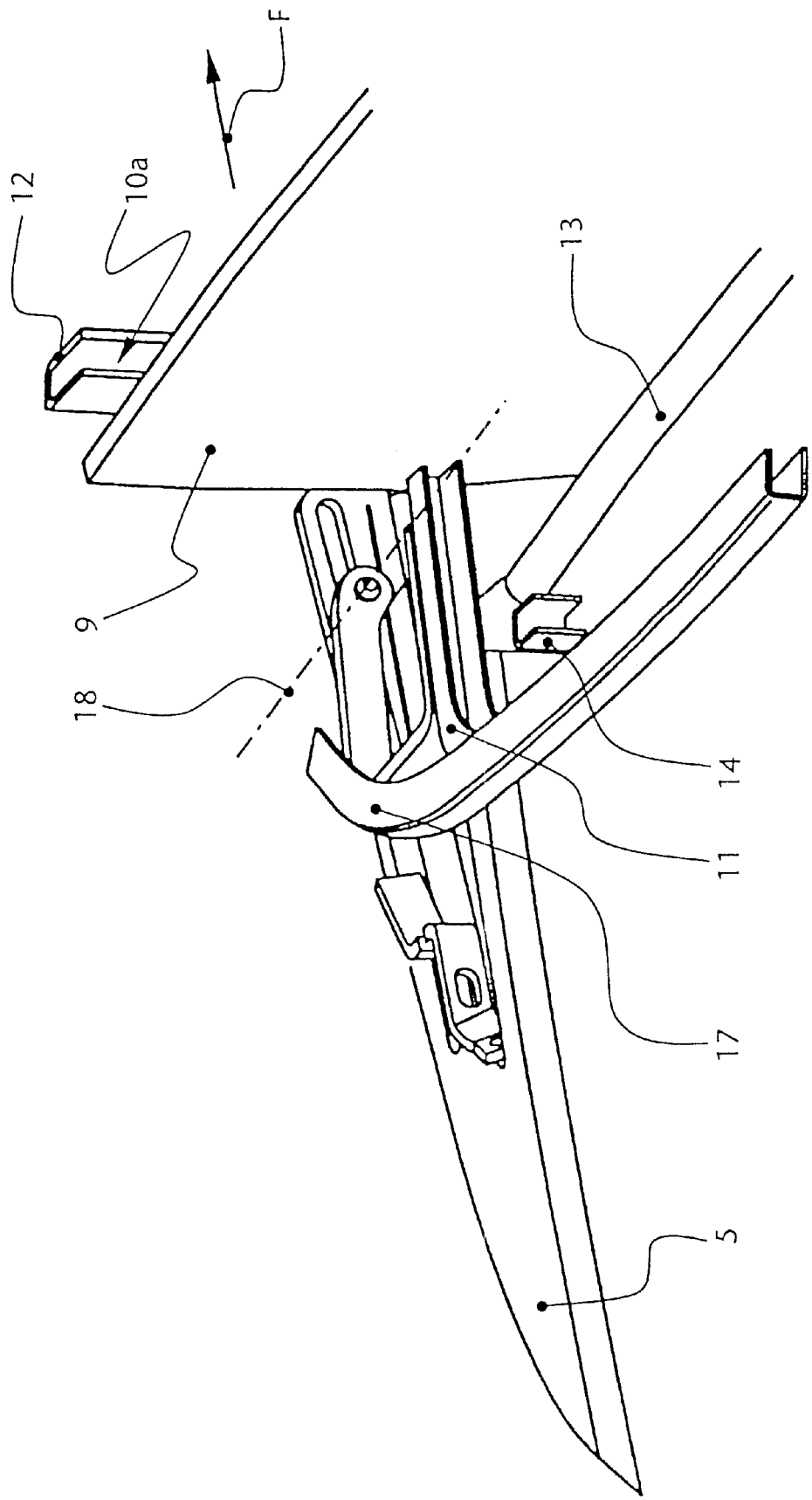

FIG. 1 shows a diagrammatic perspective view of the rear roof region of an inventive convertible, FIG. 2 shows a view from direction II onto the rod linkage parts supporting the roof, FIG. 3 shows a view, similar to that of FIG. 2, while the rear clamping collar is being swiveled up, FIG. 4 shows a view, similar to that of FIG. 3 while the roof is being folded up, and FIG. 5 shows a view, similar to that of FIG. 4, with the roof folded up completely.

DESCRIPTION OF THE PREFERRED EMBODIMENT

The convertible vehicle 1 comprises the roof 2 which can be folded up and, in the rear region has two lateral end regions 3,4, which are essentially triangular and can be stretched by the clamping collar, 5, 6 which bring about the triangular configuration by these outline contour, on a rear portion 7 of the lid.

A rear window 8 is disposed, in the driving direction F, in front of and between the lateral end regions 3,4. When the roof is closed, the rear window 8 is almost vertical or inclined slightly towards the vertical. From its normal position, which closes off the roof 2 towards the rear, the rear window 8 can be moved into a lowering position, in which it is held in a module 9 at the side of the car body. This module comprises lateral guideway sections 10a of a guideway 10. In the closed position, the rear window 8 is held in a roof fame part 11, which is open downward and comprises the lateral sections 10b of the guideway 10 for moving the rear window 8 up and down. Roof frame part 11 is U-shaped. Between the roof frame part 11 and the car body frame part 12, there is an interruption 10c of the guideway 10, so that the partial sections 10a and 10b are at a vertical distance from one another. The car body frame part can constitute a lateral guide rail.

The lateral clamping collars 5, 6 are connected with one another by a cross-connecting part 13 (also referred as a transverse connecting part), which is constructed here as a pipe. Extruded sections or other longitudinal components also come into consideration. In the area of the interruption 10c of the guideway, intermediate guiding parts 14 are disposed, which are connected rigidly with the cross-connecting part 13 and in the closed position of the roof 2, are aligned flush with the guideway 10, that is, to form a continuation of the sections 10a and 10b. In the example, the intermediate guiding parts 14 have a U-shaped cross section, as do the roof frame part 11 and the car body frame part 12. L-shape guides also come into consideration at least partially, depending on the construction.

To open the roof while the rear window 8 is closed, initially the lateral clamping collars 5 and 6 are swiveled upward so that the cross-connecting part 13, which is initially held in the closed position below the module 9 prior to the swivelling of the clamping collars 5,6, passes through the interruption 10c with the intermediate guiding part 14. As a result of the passage of the cross-connecting part 13 through the interruption 10c, the rear clamping collars 5,6 can swivel freely in the direction of the arrow 15. During this upward swivelling movement of the clamping collars 5,6, the cross-connecting part 13 is lifted over the car body frame part 12, without colliding with the module 9 or the lateral car body frame parts 12. For folding up the roof 2 further, the roof frame part 11, as a component of a rear transverse frame 17, is swiveled about the swiveling axis 18 in the direction of the arrow 19. At the same time, the clamping collars 5, 6 are shifted downward in the direction of the arrow 20. In the completely folded up position of the roof (FIG. 5), the cross-connecting part 13, as well as the intermediate guiding part 14, which is firmly connected with the former, as well as the roof frame part 11 lie far below the lateral car body frame part 12 of the module 9, over which the clamping collars 5,6 with their cross connecting part 13 were lifted. The guideway of the cross-connecting part 13 was therefore initially directed upward and rearward and, as the roof was opened further, was-directed essentially downward. Overall, for the cross-connecting part 13, a guideway is therefore attained, which comprises a lifting motion and a swiveling motion and which is also followed by the clamping collars 5, 6, which are firmly connected with the cross-connecting part 13. The lifting and swivelling movement of the cross-connecting part 13 can be attained, particularly, over a guiding rod, which is connected by means of a swiveling guide and a tie member to a rear part of the roof frame, a bearing of the guiding rod being guided in an elongated hole connecting link, in order to attain the lifting motion. The guiding rod, swiveling guide, tie member and elongated hole connecting link can be constructed by one skilled in the art to perform the recited functions without undue experimentation.

The intermediate guiding parts 14, like the cross-connecting part 13, may consist of steel, in order to ensure adequate mechanical stability by these means. Other materials, such as plastic, also come into consideration for the intermediate guiding parts 14. It is also possible to leave the interruption 10c without an intermediate guiding part 14.

What is claimed is:

1. A convertible vehicle with a roof, which can be folded up and is provided with a rear window and has, at the rear, two lateral clamping collars, which are essentially triangular in plan view, the rear window being held movably in a guideway with a roof frame part, assigned to the roof and a car body frame part, which is assigned to a car body and, in a closed normal position of the roof being movable at least regionally from the closed normal position into a lowered position, wherein the clamping collars are connected firmly with one another over a transverse connecting part and, between the roof frame part and the car body frame part, an interruption is provided in the guideway for the passage of the transverse connecting part during the folding up of the roof.

2. The convertible vehicle of claim 1, wherein, in the interruption, two lateral intermediate guiding parts are disposed, which can be aligned flush with the guideway of the roof frame part and of the car body frame part.

3. The convertible vehicle of claim 2, wherein the intermediate guiding parts are firmly connected with the transverse connecting part.

4. The convertible vehicle of claim 2, wherein the intermediate guiding parts have an L-shaped or U-shaped cross section.

5. The convertible vehicle of claim 1, wherein the guideway for the rear window has a U-shaped or L-shaped cross section in the roof frame part and in the car body frame part.

6. The convertible vehicle of claim 1, wherein the transverse connecting part is constructed as a pipe.

7. The convertible vehicle of claim 1, wherein the transverse connecting part, in the closed position of the roof, is disposed below the plane of a part which covers the roof in the lowered position.

8. The convertible vehicle of claim 7, wherein the transverse connecting part, for opening the roof, can be moved with the intermediate guiding parts in the guideway initially extending upward and rearward.

9. A convertible vehicle including a car body, comprising:
a roof movable between a closed position and an open position, said roof including a rear window movable when said roof is in the closed position between a first position in which said rear window is situated in connection with said roof and a second position in which said rear window is situated in the car body, said roof further including a roof frame part for retaining said rear window when said rear window is in the first position;
two lateral clamping collars each supporting a respective lateral side of said roof on the car body;
a transverse connecting part for connecting said clamping collars; and
a car body frame part arranged in the car body for retaining said rear window when said rear window is in the second position, a guideway being defined by said roof frame part and said car body frame part in which said rear window moves,
said roof frame part being separated from said car body frame part by a space whereby said transverse connecting part passes through said space between said roof frame part and said car body frame part during the movement of said roof between the closed and open positions.

10. The convertible vehicle according to claim 9, further comprising two lateral intermediate guiding parts, each of said intermediate guide parts being connected to a respective one of said clamping collars and arranged in said space between said roof frame part and said car body frame part, said intermediate guiding parts aligning with said roof frame part and said car body frame part to guide the movement of said rear window between the first and second positions.

11. The convertible vehicle according to claim 10, wherein said intermediate guiding parts have an L-shaped or U-shaped cross section.

12. The convertible vehicle according to claim 10, wherein said intermediate guiding parts are fixedly connected to said transverse connecting part.

13. The convertible vehicle according to claim 10, wherein said transverse connecting part and said intermediate guiding parts are arranged to be movable initially upward and rearward upon the movement of said roof from the closed position to the open position.

14. The convertible vehicle according to claim 9, wherein said roof frame part and said car body frame part have a U-shaped or L-shaped cross section.

15. The convertible vehicle according to claim 9, wherein said transverse connecting part is a pipe.

16. The convertible vehicle according to claim 9, further comprising a lid for covering said roof when said roof is in the open position, said transverse connecting part being situated below a plane of said lid when said roof is in the closed position.

17. The convertible vehicle according to claim 9, wherein said roof further includes a rear transverse frame movably connected to said clamping collars, said roof frame part being connected to said rear transverse frame.

18. A convertible vehicle including a car body, comprising:
- a roof movable between a closed position and an open position, said roof including a rear window movable when said roof is in the closed position between a first position in which said rear window is situated in connection with said roof and a second position in which said rear window is situated in the car body;
- two lateral clamping collars each supporting a respective lateral side of said roof on the car body;
- transverse connection means for connecting said clamping collars; and
- guide means for defining a guideway in which said rear window moves between the first and second positions, said guide means including a roof frame part of said roof and a car body frame part arranged in the car body, said roof frame part being separated from said car body frame part by a space whereby said transverse connection means pass through said space between said roof frame part and said car body frame part during the movement of said roof between the closed and open positions.

19. The convertible vehicle according to claim 18, wherein said guide means further comprises two lateral intermediate guiding parts, each of said intermediate guide parts being connected to a respective one of said clamping collars and arranged in said space between said roof frame part and said car body frame part, said intermediate guiding parts aligning with said roof frame part and said car body frame part.

20. The convertible vehicle according to claim 19, wherein said intermediate guiding parts are fixedly connected to said transverse connection means.

21. The convertible vehicle according to claim 19, wherein said intermediate guiding parts have a U-shaped cross section.

22. The convertible vehicle according to claim 19, wherein said transverse connection means and said intermediate guiding parts are arranged to be movable initially upward and rearward upon the movement of said roof from the closed position to the open position.

23. The convertible vehicle according to claim 18, wherein said roof frame part and said car body frame part have a U-shaped cross section.

24. The convertible vehicle according to claim 18, wherein said transverse connection means comprise an elongate pipe.

25. The convertible vehicle according to claim 18, further comprising a lid for covering said roof when said roof is in the open position, said transverse connection means being situated below a plane of said lid when said roof is in the closed position.

26. The convertible vehicle according to claim 18, wherein said further includes a rear transverse frame movably connected to said clamping collars, said roof frame part being connected to said rear transverse frame.

* * * * *